United States Patent [19]
Vanderlinden

[11] 3,721,424
[45] March 20, 1973

[54] CRANK OPERATED TANK BOTTOM PLUG VALVE

[75] Inventor: Richard J. Vanderlinden, Glenwood, Ill.

[73] Assignee: Union Tank Car Company, Chicago, Ill.

[22] Filed: June 14, 1971

[21] Appl. No.: 152,933

[52] U.S. Cl. .................. 251/144, 251/280, 251/86, 251/284, 251/334
[51] Int. Cl. ........................... F16k 1/00, F16k 31/52
[58] Field of Search......251/144, 280, 234, 231, 260, 251/279, 86, 284, 334, 318, 319; 4/52, 67

[56] References Cited

UNITED STATES PATENTS

| | | | |
|---|---|---|---|
| 3,656,710 | 4/1972 | Shaw | 251/144 |
| 1,380,867 | 6/1921 | Bolotoff | 251/280 |
| 930,101 | 8/1909 | Stevens | 251/86 X |
| 2,217,129 | 10/1940 | Mills | 251/279 X |
| 1,975,454 | 10/1934 | Frye | 251/318 |
| 3,174,717 | 3/1965 | Bray | 251/86 X |

Primary Examiner—William R. Cline
Attorney—Charles M. Kaplan et al.

[57] ABSTRACT

The outlet valve of the present invention includes a valve body member having a first and second opening associated therewith. A plug type valve member is positioned above the first opening and is vertically moveable between a closed position, wherein the valve member is in contact with a valve seat associated with the first opening, and an opened position, wherein the valve member is spaced from the valve seat. An operator means is provided for moving the valve member between its opened and closed positions which includes a unique linkage arrangement having a first position wherein the valve member is in its open position and a third position wherein the valve member is in its closed position and the linkage members are in a locked position.

One of the linkage members includes means to adjust the length thereof to compensate for manufacturing tollerances and component wear. Guide wings are provided to ensure that the valve member accurately contacts the valve seat when the vale member is in its closed position. The operator means is secured to the valve member by a ball and socket arrangement to permit the valve member to rotate about a substantially vertical axis so as to prevent uneven wear of the valve seat and valve gasket.

8 Claims, 3 Drawing Figures

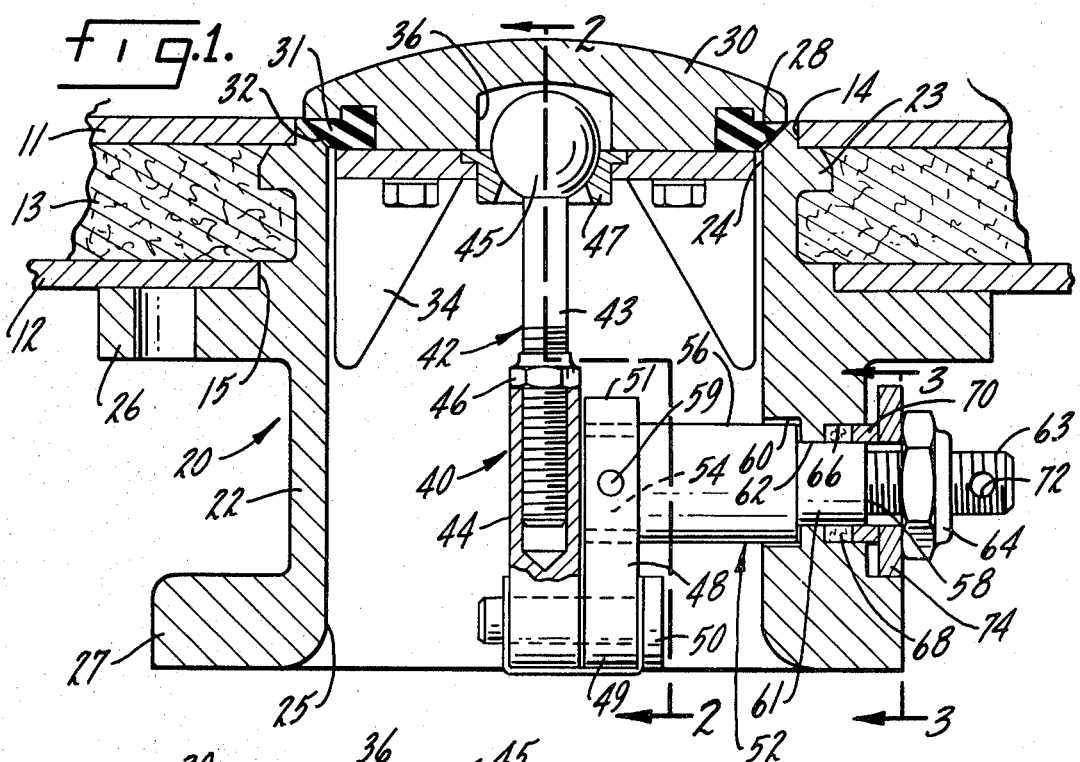
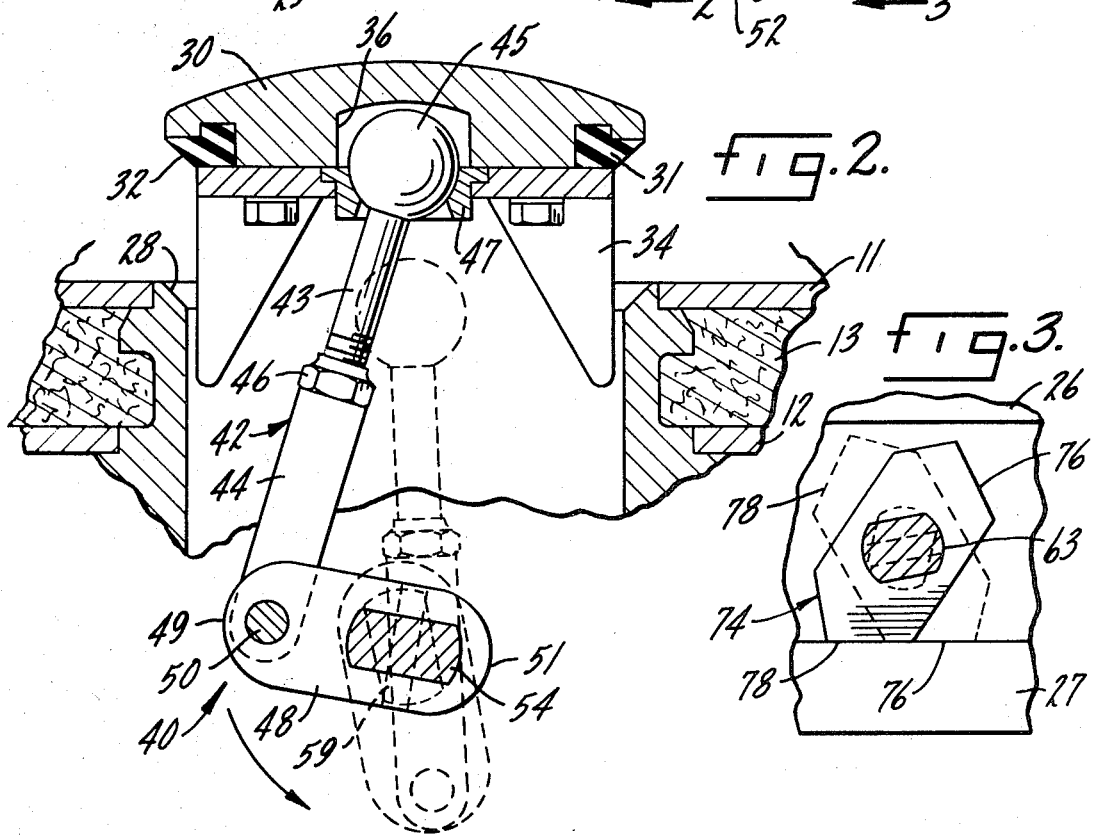

CRANK OPERATED TANK BOTTOM PLUG VALVE

BACKGROUND AND SUMMARY OF THE INVENTION

This invention relates to a plug type outlet valve and more particularly to a bottom operated plug type bottom outlet valve for use in railroad cars and the like.

Heretofore, plug type bottom outlet valves of the type carried by railroad tank cars have not been widely utilized in the industry. The bottom operated valve commonly used is of the ball valve type which is more costly to manufacture and maintain. The present invention provides a plug type outlet valve for use in railroad tank cars having a simplified design with few moving parts, which minimizes manufacturing and maintenance costs. Also provided are means to adjust the valve operator to ensure a fluid tight seal when the valve is in its closed position. Prior art plug type valves do not provide for such adjustment which may be required because of manufacturing error or wear of component parts. The valve operator of the present invention further includes a unique valve operator which accurately and rapidly moves the valve between its closed and opened positions and, in addition, includes a locked position to prevent the valve from accidently opening.

The primary object of the present invention is to provide a bottom operated plug type bottom outlet valve having a simplified design with few moving parts that is reliable in operation.

Another object is to provide such a plug type valve which includes valve operator means which accurately and rapidly moves the valve between its closed and opened positions and provides a simple and reliable means to ensure that the valve remains securly sealed when in its closed position.

A further object is to provide such a plug type valve which includes adjustment means to compensate for manufacturing tollerances and wear of component parts and thereby ensures reliable operation.

A still further object is to provide such a plug type valve which readily permits rotation of the valve plug to prevent uneven wear of the valve seat and valve gasket.

Another object is to provide such a plug type valve that is particularly adaptable for use in railroad tank cars and the like and which is inexpensive to manufacture and maintain.

The outlet valve of the present invention includes a valve body member having a first opening in fluid communication with the tank car discharge opening and a second opening in fluid communication with the first opening. A plug type valve member is positioned above the first opening and is vertically moveable between a closed position, wherein the valve member is in contact with a valve seat associated with the first opening so as to close off fluid communication therethrough, and an opened position, wherein the valve member is spaced from the valve seat so as to permit fluid communication therethrough. An operator means is provided for moving the valve member between its opened and closed positions which includes a unique linkage arrangement having a first position wherein the valve member is in its opened position, a second position wherein the valve member is in its closed position and a third position wherein the valve member is in its closed position and the linkage members are in a locked position. One of the linkage members includes means to adjust the length thereof to compensate for manufacturing tollerances and component wear. Guide wings are provided to ensure that the valve member accurately contacts the valve seat when the valve member is in its closed position. The operator means is secured to the valve member by a ball and socket arrangement to permit the valve member to rotate about a substantially vertical axis so as to prevent uneven wear of the valve seat and valve gasket.

DESCRIPTION OF THE DRAWINGS

Other objects and features of the invention will become apparent to those skilled in the art as the disclosure is made in the following description of a preferred embodiment of the invention, as illustrated in the accompanying sheet of drawings, in which:

FIG. 1 is a sectional view taken through the plug-type bottom outlet valve of the present invention associated with an insulated railroad tank car, illustrating the structural details of said valve when in its closed position;

FIG. 2 is a sectional view taken along line 2—2 of FIG. 1 showing in solid lines the valve member and operating means when in their respective opened and first positions and showing the operating means in dotted lines when in its third or locked position; and FIG. 3 is a sectional view taken along line 3—3 of FIG. 1 illustrating the position of the cam stop member when the valve is in its closed position in solid lines and when the valve is in its opened position in dotted lines.

DESCRIPTION OF A PREFERRED EMBODIMENT

Referring to FIGS. 1 and 2, a bottom portion of an insulated version of a railroad tank car is illustrated having a commodity confining tank shell 11, which is a structurally stable and fully enclosed cylindrical unit that is supported at the opposite ends thereof by conventional body bolster and center sill assemblies, and an outer housing or jacket 12 surrounding shell 11 so as to define a region to receive insulating material 13 therein. The lower or bottom walls of shell 11 and jacket 12 are provided with conventional discharge openings 14 and 15 respectively, which receive the bottom outlet valve 20 embodying features of the present invention. Although disclosed with respect to a railroad tank car, it should be understood that advantageous use of outlet valve 20 may be made in other applications by individuals skilled in the valve art.

Outlet valve 20 includes valve body member 22 cylindrical in form and provided with a pair of annular flanges 23 and 26 which are respectively secured in a conventional manner to shell 11 and jacket 12. The upper portion of body member 22 passes through discharge openings 14 and 15 and has a first opening 24 associated therewith in fluid communication with the interior of shell 11. A second opening 25 in member 22 is provided in opposing relationship to, and in fluid communication with, opening 24. An annular flange 27 is provided about body member 22 at opening 25. Conventional fittings may be provided at flange 27 for receipt of conventional unloading equipment. The inner surface of body member 22 adjacent opening 24 is bevelled to form valve seat surfaces 28 about the inner circumference thereof. Alternatively, a separate valve seat insert maybe fitted about the inner surface of body member 22 at opening 24. Also, second opening 25 may be positioned through the sidewall of body member 22 instead of through the bottom thereof.

Plug type valve member 30, having inclined peripheral edges 32, is arranged in position to seat upon valve seat surfaces 28. Valve member 30 is moveable between a closed position wherein valve member 30 seats on valve seat surfaces 28 to thereby close off fluid communication through opening 24, as seen in FIG. 1, and an open position wherein valve member 30 is spaced from valve seat surfaces 28 to thereby permit fluid communication through opening 24, as seen in FIG. 2. Valve member 30 is provided with a flexible gasket insert 31, about the outer periphery thereof, having peripheral edges 32 to contact seat surfaces 28 and prevent fluid flow from shell 11 through opening 24. Alternatively, peripheral edges 32 may be formed by bevelling the outer edges of valve member 30. Valve member 30 has a plurality of downwardly projecting guide wings 34 secured to the undersurface thereof, the outer edges of which are formed to slidingly engage the inner walls of member 22 in order to guide movement of valve member 30 between its opened and closed positions. Guide wings 34 are vertically dimensioned such that they extend through opening 24 when valve member 30 is in its open position, as seen in FIG. 2, and thereby limits valve member 30 to vertical movement and thus facilitates contact between edges 32 and seat surfaces 28 when valve member 30 is in its closed position.

Valve operator means 40 is provided to accurately and rapidly move valve member 30 between its opened and closed positions. Operator means 40 includes a first link 42, a second link 48, and an operating crank member 52. Link 42 has a first section 43, having a ball 45 attached to the upper end thereof which is received in socket 36, centrally positioned through the undersurfaces of valve member 30 such that valve member 30 is free to rotate about a substantially vertical axis. Retaining member 47 prevents ball 45 from leaving socket 36. The lower end of section 43 is threadedly received by the upper end of a second section 44 of link 42. An adjustment nut 46 is provided to permit the length of link 42 to be selectively adjusted in length. Link 48 has a first end 49 pivotally secured about a horizontal axis to the lower end of section 44 by pin 50. Second end 51 of link 48 is rigidly secured to a stem or crank member 52.

Crank member 52 includes an inner end portion 54, a stem portion 56, and an outer end portion 58. Inner end portion 54, having segments cut from opposite sides of its circular end, as best seen in FIG. 2 is received by a similarly shaped aperture through the second end 51 of link 48 and is attached thereto by a pin 59. Portion 54 is preferably of a non-circular section to preclude rotation thereof with respect to link 48. Stem portion 56, being circular in section, extends outward from portion 54 and is received in a circular inner recess 60 in body member 22. Outer end portion 58 includes a circular section 61 at its inner end, of lesser diameter than portion 56, which passes through a circular aperture 62 in body member 22 concentric with recess 60. The outer end of portion 58 includes a non-circular section 63, as best seen in FIG. 3, which extends outside of body member 22 and is threaded to receive a locking nut 64. A circular outer recess 66 in body member 22, concentric with aperture 62, receives a conventional packing 68 and a retaining sleeve 70 to fill recess 66 and prevent the flow of fluid through aperture 62. An aperture 72 at the end of section 63 is provided to receive a locking pin to secure a rod to section 63, to facilitate rotation of crank member 52.

Secured between nut 64 and sleeve 70 is a cam stop member 74 to limit rotation of crank member 52 between a position wherein valve member 30 is in a closed position, as seen in solid lines in FIG. 3, and a position wherein valve member 30 is in an opened position and links 42 and 48 are in a locked position, as seen in dotted lines in FIG. 3. Referring to FIGS. 2 and 3, cam stop member 74 includes a non-circular aperture therethrough shaped to receive portion 58 of member 52 and rotate therewith. Nut 64 securely holds in place member 74, sleeve 70 and packing 68 in a manner that permits the rotation of crank member 52, which passes through aperture 62, without allowing fluid to pass through aperture 62. Member 74 is positioned on member 52 such that it is inside the outer periphery of flange 27 of body member 22, as seen in FIG. 2. Member 74 is polygonal in shape and dimensioned such that it includes two surfaces 76 and 78 which are angled to contact the top surface of flange 27 and preclude further rotation of member 74. Surfaces 76 and 78 are so arranged so as to limit the rotation of crank member 52 between the desired positions mentioned above.

At this point a brief description of the operation of valve 20 will be helpful to show the space relationships of the previously disclosed structural elements. With valve 20 in its opened position, as seen in FIG. 2 in solid lines, valve member 30 and peripheral edges 32 associated therewith are spaced above valve seat surfaces 28 so as to permit fluid flow through opening 24. Valve operator means 40 is in a first position wherein the included angle between the center lines passing through links 42 and 48 is approximately 90° and surface 76 of member 74 is in contact with flange 27, as in dotted lines in FIG. 3. It should be noted that guide wings 34 extend into opening 24 when valve member 30 is in its opened position. In order to move valve member 30 from its opened position to its closed position a rod is inserted about section 63 and member 52 is rotated in a counterclockwise direction. Rotation of member 52 is imparted to link 48 which rotates therewith such that end 49 and link 42 pivotally secured thereto are rotated in a counterclockwise direction. Links 42 and 48 are dimensioned such that edges 32 contact surfaces 28 just prior to the vertical alignment of the center lines passing through links 42 and 48. Further rotation of member 62 increases compression between edges 32 against surfaces 28 until the center lines passing through links 42 and 48 reach vertical alignment at which point there is maximum compression therebetween. Rotation of member 62 is continued until surface 78 of member 74 contacts the upper surface of flange 27, as seen in solid lines in FIG. 3, and links 42 and 48 are in a locked or overcentered relationship, as seen in dotted lines in FIG. 2. In this position edges 32 and surfaces 28 are in sufficient compression to prevent the flow of fluid through opening 24 but are in less compression than when the respective center lines passing therethrough are in vertical alignment. It is this relationship that locks links 42 and 48 in position since the compressive force between edges 32 and surfaces 28 tends to pivot link 48 in a counterclockwise direction and the contact between surface 78 and flange 27 prevents such rotation. By reversing the above steps valve member 30 may be moved from its closed position to its opened position.

In order to retain angular and dimensional relationships between links 42 and 48 so as to ensure that the proper compressive force is applied to edges 32 and surfaces 28, it may be necessary to adjust the length of link 42. This is easily accomplished by changing the length of portion 43 which is received by portion 44 and locking nut 46 in position immediately above portion 44 after the desired length is attained. Further, in order to prevent uneven wear of valve seat surfaces 28 and edges 32 of valve gasket 31, it is desireable to periodically rotate valve member 30 about ball 45 and thereby change the contacting surfaces between edges 32 and surfaces 28, when the valve is in its closed position.

Various modifications are contemplated and may obviously be resorted to by those skilled in the art without departing from the spirit and scope of the invention, as hereinafter defined by the appended claims, as only a preferred embodiment thereof has been disclosed.

What is claimed is:

1. A plug type valve assembly, comprising: a valve body member having first and second openings formed therein; a valve seat associated with said first opening; plug type valve means positioned above said first opening having a closed position in contact with said valve seat so as to close off fluid communication through said first opening and an opened position spaced from said valve seat so as to permit fluid communication through said first opening; operator means for moving said valve means having a first position wherein said valve means is in said opened position, a second position wherein said valve means is in said closed position in contact with said valve seat, and a third position wherein said valve means is in said closed position and said operator means is biased away from said first position; said operator means including a first link having a ball member attached thereto which is received by a cooperating socket associated with said valve means so as to permit said valve means to pivot about a universal axis, a second link having a first end pivotally mounted about a substantially horizontal axis to a second end of said first link, and a substantially horizontal crank member having a first end secured to a second end of said second link such that rotation of said crank member pivots said second link about its first end which in turn imparts simultaneous pivotal movement and vertical movement to said first link; and stop means for limiting rotation of said crank member between its position when said operator means is in its first position and its position when said operator means is in its third position, said stop means including a polygonal member secured to said crank member having a first surface for contacting a flange integral with said valve body member when said operator means is in said first position and a second surface for contacting said flange when said operator means is in said third position.

2. The invention of claim 1, wherein guide means are secured to said valve means for limiting said valve means to substantially vertical movement so as to facilitate contact between said valve means and said valve seat when said valve means is in said closed position.

3. The invention of claim 2 wherein said guide means includes a plurality of guide wings secured to the bottom surface of said valve means, said guide wings being dimensioned to extend through said first opening and slidingly engage the inner walls of said valve body member when said valve means is in said opened position.

4. The invention of claim 1 wherein the included angle between the center lines passing through said first and second links is less than 180° when said operator means is in said first position, the included angle between said center lines passing through said first and second links is approximately 180° when said operator means is in said second position, and the included angle between said center lines passing through said first and second links is greater than 180° when said operator means is in said third position.

5. The invention of claim 1 wherein the compressive force between said valve means and said valve seat is greater when said operator means is in said second position than when in said third position.

6. The invention of claim 1 wherein said first link is selectively adjustable in length.

7. The invention of claim 6 wherein said first link includes a first and second section, said first and second sections each having first and second ends associated therewith, said first end of said first section being secured to said valve means, said second end of said first section being adjustably secured to said first end of said second section by connecting means which permits the length of said first section to be selectively changed, and said second end of said second section being secured to said first end of said second link.

8. The invention of claim 1 wherein said valve means includes a flexible gasket associated therewith to compressively contact said valve seat when said valve means is in said closed position.

* * * * *